No. 836,097. PATENTED NOV. 20, 1906.
A. C. F. DANN.
ROLLER FRICTION CLUTCH.
APPLICATION FILED NOV. 19, 1903.
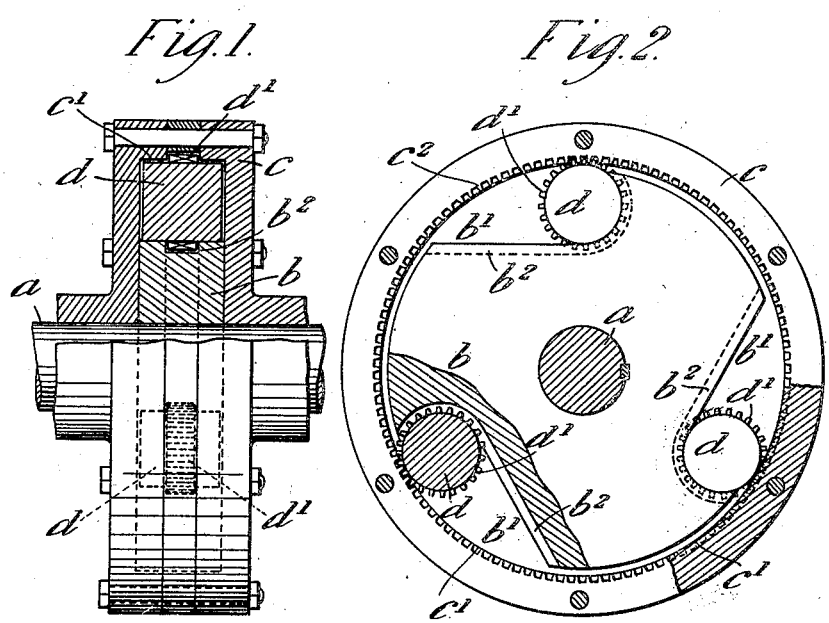
WITNESSES
INVENTOR

UNITED STATES PATENT OFFICE.

AUGUSTUS C. F. DANN, OF SOUTHSEA, ENGLAND.

ROLLER FRICTION-CLUTCH.

No. 836,097.   Specification of Letters Patent.   Patented Nov. 20, 1906.

Original application filed August 29, 1903, Serial No. 171,180. Divided and this application filed November 19, 1903. Serial No. 181,813.

*To all whom it may concern:*

Be it known that I, AUGUSTUS CARDIGAN FREDERICK DANN, a subject of the King of Great Britain and Ireland, residing at 54 St. Augustine road, Southsea, in the county of Hants, England, have invented certain new and useful Improvements in Roller Friction-Clutches, of which the following is a specification, (for which I have obtained patents in Belgium, dated August 21, 1903, No. 172,136; Luxemburg, August 24, 1903, No. 5,249; and have applied for patents in Great Britain, dated August 21, 1903, No. 18,127; Germany, dated August 21, 1903; Denmark, August 21, 1903, No. 1,011; France, August 21, 1903, No. 886; Sweden, August 21, 1903, No. 1,598; Norway, August 22, 1903, No. 16,733; Spain, August 24, 1903, No. 1750; Switzerland, August 22, 1903, No. 33,069; Russia, August 25, 1903; Hungary, August 28, 1903, No. 11,310; Austria, August 24, 1903; Canada, August 29, 1903, No. 107,490; Italy, August 24, 1903, No. 17,391, and Portugal, August 24.)

This invention, which was included in my original application filed August 29, 1903, Serial No. 171,180, of which this is a division, relates to improvements in friction-clutches of the kind in which the two members are correlated by means of one or more rollers working between inclined surfaces on the two members; and it consists in providing the rollers with a band of teeth round their periphery which engage with a corresponding band of teeth formed in one of the clutch members. By this means the rollers are always forced to roll along the clutch-surfaces in moving between the free and clutched positions and the liability to the formation of flat portions on the rollers completely annulled.

In the accompanying drawings, Figure 1 is an elevation, partly in section, of a clutch constructed according to the present invention; and Fig. 2, a transverse vertical section through the center of Fig. 1.

Keyed on the shaft $a$ is a disk $b$, forming the fixed member of the clutch, the free member of which is the inclosing casing or shell $c$. The periphery of the disk $b$ is cut away in one or more places to form plane surfaces $b'$, between which and the inner face $c'$ of the rim of the shell $c$ the rollers $d$ operate in the well-known manner. These rollers are formed with a band of teeth $d'$, preferably round the middle part, which projects beyond the roller-surfaces and engage with a corresponding band of teeth $c^2$, formed in the inner periphery of the rim $c'$. A slot $b^2$ is cut along the face of the plane surface $b'$ and its cylindrical continuation of sufficient depth to clear the teeth of the rollers.

The teeth on the rollers and on the clutch should be in engagement for all positions of the roller; but they must not engage with each other in such a way as to be subjected to any part of the stress which the rollers transmit when in the clutched position.

Having thus described the nature of my said invention and the best means I know of carrying the same into practical effect, I claim—

1. In roller friction-clutches, an inner member, an outer member, a roller between them having a smooth cylindrical surface engaging smooth inclined surfaces on the two members, and a band of teeth formed on the roller and engaging in a corresponding band of teeth formed on one of the members of the clutch.

2. In roller friction-clutches, an inner member, an outer member, a roller between them having a smooth cylindrical surface engaging smooth inclined surfaces on the two members, and a band of teeth formed on the rollers and engaging in a corresponding band of teeth on the loose member of the clutch; substantially as described.

3. A friction-clutch comprising one member fixed to a shaft on which the second member is loosely mounted, both members having smooth operating-surfaces, one or more rollers having smooth surfaces arranged to engage said operating-surfaces of both members frictionally for a given direction of rotation of the shaft, each roller being provided with a band of teeth in engagement with a corresponding band of teeth on one of the two members of the clutch.

4. A friction-clutch comprising one member fixed to a shaft on which the second member is loosely mounted, both members having smooth operating-surfaces, and one or more rollers having smooth surfaces arranged to engage said operating-surfaces of both members frictionally for a given direction of rotation of the shaft, each roller being provided with a band of teeth in engagement with a corresponding band of teeth on the loose member of the clutch; substantially as described.

5. A friction-clutch comprising a disk surrounded by a shell having an internal smooth cylindrical surface, one or more flat portions on the periphery of the disk, a roller for each such flat portion having a smooth surface adapted to engage between the said flat portion and the inner periphery of said shell, and means for compelling the rollers to rotate when they are moved translationally.

6. A friction-clutch comprising a disk surrounded by a shell having an internal cylindrical surface, one or more flat portions on the periphery of the disk, a roller having a smooth surface adapted to engage between each such flat portion and the inner periphery of said shell, and a band of teeth on each roller in engagement with a corresponding band of teeth on one of the clutch members.

7. A friction-clutch comprising a disk surrounded by a shell having an internal cylindrical surface, one or more flat portions on the periphery of the disk, a roller having a smooth surface adapted to engage between each such flat portion and the inner periphery of said shell, and a band of teeth on each roller in engagement with a corresponding band of teeth on the inner periphery of the cylindrical shell; substantially as described.

8. A friction-clutch comprising a disk fixed to a shaft, a shell having an internal cylindrical surface surrounding the disk and loosely mounted on the said shaft, one or more flat portions on the periphery of the disk, a roller having a smooth surface adapted to engage between each such flat portion and the inner periphery of said shell, a band of teeth on each roller in engagement with a corresponding band of teeth on the inner periphery of the cylindrical shell; substantially as described.

9. A friction-clutch comprising a disk fixed to a shaft, a cylindrical shell surrounding the disk and loosely mounted on the said shaft, one or more flat portions on the periphery of the disk, a roller adapted to engage between each such flat portion and the inner periphery of the cylindrical shell a band of teeth on each roller, a corresponding band of teeth on the inner periphery of the shell in engagement with the roller-teeth, and a slot in the face of each said flat portion to admit the roller-teeth, substantially as described.

10. A friction-clutch comprising a disk keyed to a shaft, a cylindrical shell surrounding the disk and loosely mounted on the said shaft, a plurality of rollers engaging between the inner periphery of the cylindrical shell and flat portions formed on the edge of the disk, bands of teeth on the rollers in engagement with a corresponding band of teeth on the inner periphery of the cylindrical shell, and slots in the face of each flat portion of the edge of the disk, substantially as described with reference to the accompanying drawings.

11. A friction-clutch comprising a fixed member and a loose member both having smooth operating-surfaces, a smooth roller coöperating with said surfaces, and means compelling the said roller to roll into and out of joint contact with the said surfaces; substantially as described.

In testimony whereof I have signed my name to this specification in the presence of two subscribing witnesses.

A. C. F. DANN.

Witnesses:
 A. KIRBY,
 ROBT. J. CUNNINGHAM.